July 1, 1969 — V. R. CAMPBELL — 3,453,009
TUBE COUPLING
Filed Sept. 27, 1967 — Sheet 1 of 2

INVENTOR
VERNON R. CAMPBELL
BY
Burton & Parker
ATTORNEYS

July 1, 1969  V. R. CAMPBELL  3,453,009
TUBE COUPLING

Filed Sept. 27, 1967  Sheet 2 of 2

INVENTOR
VERNON R. CAMPBELL
BY
Burton & Parker
ATTORNEYS

United States Patent Office 3,453,009
Patented July 1, 1969

3,453,009
TUBE COUPLING
Vernon R. Campbell, Berkley, Mich., assignor to L & L Manufacturing Company, St. Clair Shores, Mich., a corporation of Michigan
Filed Sept. 27, 1967, Ser. No. 671,084
Int. Cl. F16l 19/08, 21/02, 25/00
U.S. Cl. 285—341                7 Claims

ABSTRACT OF THE DISCLOSURE

This disclosure relates to a tube coupling which is suitable for sealing light and heavy wall tubing without the need for flaring the tube end; but is also suitable for flaring light-wall tubing. The coupling includes a coupling body having a tube-end receiving bore, a threaded nut, and a sleeve assembly received over the tube end, within the nut. The sleeve assembly includes a metal sleeve, and a relatively harder metal biting ring received in a counterbore of the sleeve. In the self-flaring tube coupling embodiment of this invention, the tube end receiving bore of the body includes a flaring cone.

---

The prior art includes a number of tube coupling's having metal biting rings. The examples of such couplings include the following U.S. Patents; 2,064,140, 2,127,284, 2,475,741, 2,566,769, 2,585,453, 2,613,086, 2,787,479. The coupling shown by the last three patents cited above also include a rubber sealing sleeve which receives the biting ring. A coupling having a nonmetallic sleeve, however, is limited to handling of fluids which will not chemically attack the material of the sleeve, within the temperature and pressure range specified for the material. Further, rubber gaskets or sealing sleeves will tend to extrude out of the chamber provided, because they are resilient and incompressible. For these reasons a metallic sleeve is preferable, however the prior art does not teach a tube coupling having a combination metal sleeve and biting ring which is suitable for commercial use.

SUMMARY OF THE INVENTION

Briefly, the tube coupling of this invention includes a coupling body having a tube end receiving bore, a nut means threadably received on the coupling body, and a sleeve assembly received over the tube end, within the nut means. The sleeve assembly includes a metallic sleeve having a counterbore adjacent the forward or leading end, and a biting ring received within the counterbore of the sleeve. The leading end of the sleeve is received in a converging generally conical throat of the bore of the coupling body, which deforms the sleeve end into sealing engagement with the tube, adjacent the biting ring. The biting ring is simultaneously radially contracted into biting engagement with the tube.

In one of the embodiments of the tube coupling of this invention, the biting ring is received in a groove defined adjacent the leading end of the sleeve, and the sleeve end is initially spaced from the plane of the tube. In the other embodiment disclosed, the exterior of the sleeve is provided with a radial groove, which weakens the leading end of the sleeve for deformation into sealing contact with the tube.

The metal sleeve is preferably made of a material which is softer than the coupling body, such as hardened aluminum, to aid in sealing and prevent damage to the coupling body during assembly. And, the biting ring should be harder than the tube to insure biting contact.

The converging conical wall of the coupling body preferably terminates in an arcuate surface to incearse the wedging action of the leading end of the sleeve, and permit reuse of the coupling. The arcuate surface serves as a constantly increasing angle as the sleeve end is deformed into sealing contact with the tube. Where hardened aluminum is used for the material of the sleeve, the sleeve end will be elastically deformable, however, where steel is utilized, substantial permanent deformation will occur.

The tube coupling of this invention is capable of sealing heavy and light wall tubing without requiring flaring of the tube end. Further the coupling can be utilized to flare relatively thin wall tubing when required to meet extreme pressure and vibrational requirements. The coupling is capable of achieving a seal with a relatively low assembly torque, and can handle a wide variety of fluids without the need of changing the material of the sleeve. The coupling is simpler to manufacture and the sleeve may be made from a wide variety of materials capable of withstanding a wide temperature range, and severe overtightening torques.

Other advantages, and meritorious features of this invention will more fully appear from the following specification, claims, and accompanying drawings, wherein:

Figure 1:
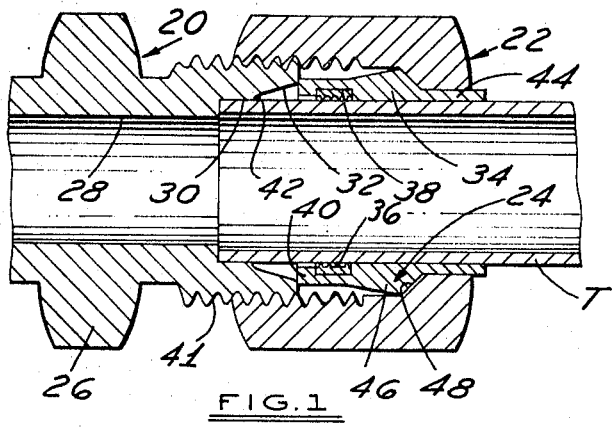
FIGURE 1 is a cross-sectional view of one embodiment of the tube coupling of this invention, prior to tightening of the coupling nut.

The tube coupling of my invention is particularly suited for use with tubing of a wide variety of materials, including carbon steel, stainless steel, aluminum, copper, brass, etc. The coupling may be utilized to seal various types of fluid-conveying lines, such as used in hydraulic, refrigeration, and chemical systems. It will achieve a seal in light and heavy wall tubing, without the need of flaring the tube end. However, the coupling of my invention may be used to flare relatively thin wall tubing, where required by extreme pressure and vibrational requirements, and reduce the danger of collapsing the tube, or pulling apart of the connection.

The embodiment of the tube coupling of my invention shown in FIGURES 1 to 6, includes a coupling body 20, a coupling nut 22, and a metallic sleeve assembly generally indicated at 24. The coupling body of the type shown generally includes a threaded end, not shown, adapted to be connected with a fluid system in which the coupling is to be used. The coupling body may also be provided with a wrench engaging portion 26 for enabling connection of the body to the fluid conveying system, and holding the body during connection with a tube T. The external configuration of the wrench engaging portion may be hexagonal for this purpose. The coupling body has a flow passage 28 therethrough, and this embodiment includes a tube end receiving counterbore 30 opening into a converging generally conical throat 32.

The sleeve assembly includes a metallic sleeve 34, receivable over the end of the tube T, and a biting ring 36 which is received in a slot or counterbore 38 defined adjacent the leading end 40 of the sleeve.

The coupling body 20 is threaded at 41 to receive the nut 22 which urges the sleeve assembly axially into the converging throat 32 of the coupling body. In this embodiment, the throat terminates in a radiused surface 42 to aid in sealing the leading end of the sleeve against the tube, as described hereinafter.

The sleeve 24 and the biting ring 36 are preferably metallic, rather than plastic or synthetic rubber, because a metal-to-metal seal is considered more reliable, especially in high pressure fluid systems, and because of the limitations on temperature and causticity of the fluid conveyed in a system having a sealing material subject to deterioration. Utilization of a metallic sleeve however has not been commercially satisfactory in high pressure systems, unless the tube end is flared, because the tube is not adequately secured in the coupling with conventional metallic sleeves; or the gripping ring, when such is used, is subject to leakage. The two-part metallic sleeve assembly 24 of my invention however is designed to provide a metal-to-metal seal and securely retain the tube in the assembly.

Figure 4:
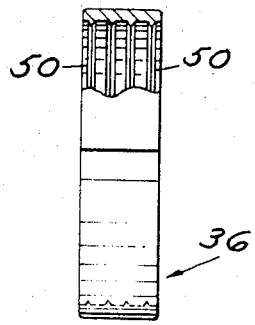
FIGURE 4 is a side view of the biting ring utilized in the embodiment of FIGURES 1 to 3, partially cross-sectioned to show the biting teeth.
Figure 5:
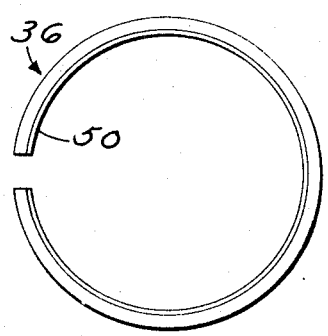
FIGURE 5 is an end view of the biting ring shown in FIGURE 4.
Figure 6:
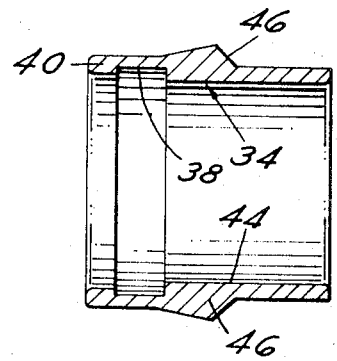
FIGURE 6 is a cross-sectional view of the sleeve utilized in the embodiment of FIGURES 1 to 3.

The sleeve 34 of this embodiment is provided with a tubular rearward portion 44 which closely overlies the tube T, and a radial shoulder 46, which is engaged by a complementary internal shoulder 48 of the nut, to urge the sleeve axially. The leading end 40 of the sleeve is initially spaced from the external diameter of the tube, and is deformably urged into sealing engagement with the tube by the converging throat 32 of the body. The biting ring, in this embodiment, is split as shown in FIGURES 4 and 5, such that the ring may be received in the enclosed slot 38, adjacent the leading end of the sleeve. The biting ring is provided with a plurality of radially extending teeth 50 for biting engagement with the exterior surface of the tube. In the preferred embodiment of my invention, the teeth extend circumferentially perpendicular to prevent spiral leakage in high pressure systems.

The sleeve 34 is preferably softer than the coupling body and the tube to prevent damage to the conical throat of the body during sealing, and insure adequate sealing of the sleeve end against the tube. The sleeve may be formed from various materials, however heat treated aluminum or brass, and low carbon steel has provided excellent results. Properly selected hardened aluminum or copper alloys have a higher yield point than untreated aluminum or brass, and a lower modulus of elasticity and higher yield strength than annealed steel. Hardened aluminum or copper alloys are therefore particularly suitable for the sleeve of this embodiment, where the leading end of the sleeve 40 is elastically deformed into sealing engagement, as described hereinafter. The alloys may be hardened by heat treating or strain hardening. Low carbon steel may be preferred in the embodiment of FIGURES 7 and 8.

The biting ring 36 is preferably formed of a material which is harder than the tube T, and therefore may be formed from carburized low carbon steel, or heat treated high carbon steel. The coupling body and nut may be formed from conventional materials, such as steel.

Figure 2:
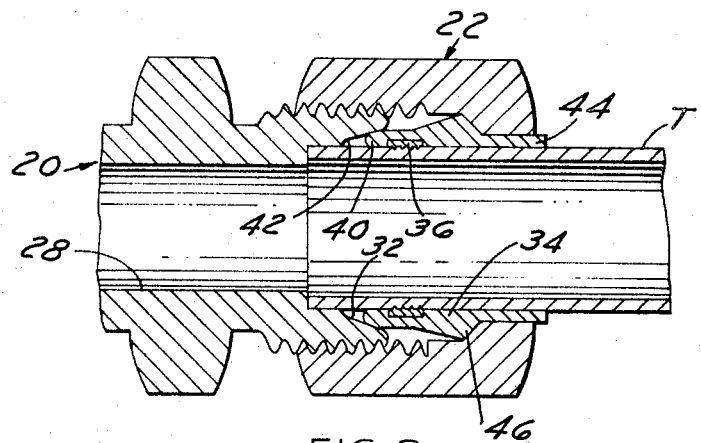
FIGURE 2 is a cross-sectional view of the tube coupling of FIGURE 1, after the tube coupling nut has been partially tightened.
Figure 3:
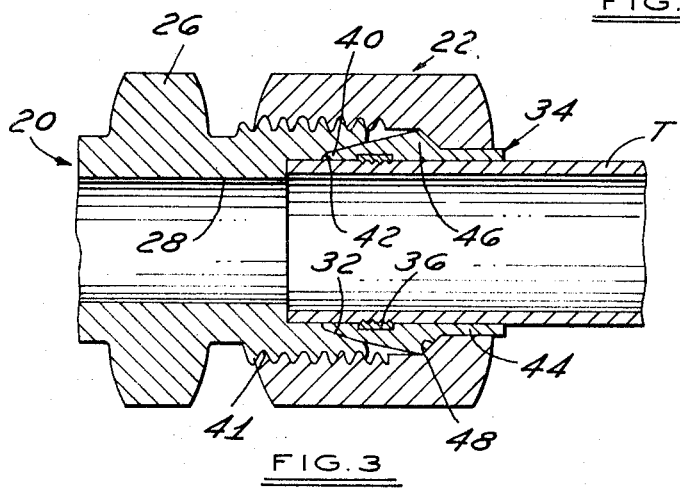
FIGURE 3 is a cross-sectional view of the tube coupling of FIGURES 1 and 2, after the tube coupling nut has been fully tightened.

Threading of the coupling nut toward the body urges the leading end 40 of the sleeve into the generally conical throat 32 of the body, as shown in FIGURE 2. The conical throat deforms the sleeve end radially into contact with the exterior of the tube. Where the sleeve is resilient, such as where the sleeve is formed from heat treated aluminum or brass, the sleeve end 40 is elastically deformed against the tube, and the sleeve will return substantially to the undeformed configuration on removal, as shown in FIGURE 1, permitting the assembly to be reused.

Radial deformation of the sleeve end contracts the biting ring 36 into biting engagement with the tube end, as shown in FIGURE 2. It can be seen from a comparison of FIGURES 1 and 2 that the leading end of the sleeve 40 pivots about the forward or leading end of the biting ring, causing the ring to bite into the tube almost immediately upon threading of the nut after hand tightening. This prevents the tube from slipping within the sleeve assembly and provides a seal with comparatively low assembly torque.

Further tightening of the nut causes the sleeve end 40 to engage the curved or radiused end 42 of the converging throat 32. The radiused surface serves as a consantly increasing angle for the throat, reducing the amount of radial deformation for a given amount of axial force. This configuration provides a superior metal-to-metal seal, and permits reuse of a partially deformed sleeve due to the increased radial deformation. It can be seen in FIGURE 3 that the sleeve end 40 substantially fills the end of the coupling body throat, providing a full metal-to-metal seal.

Figure 7:
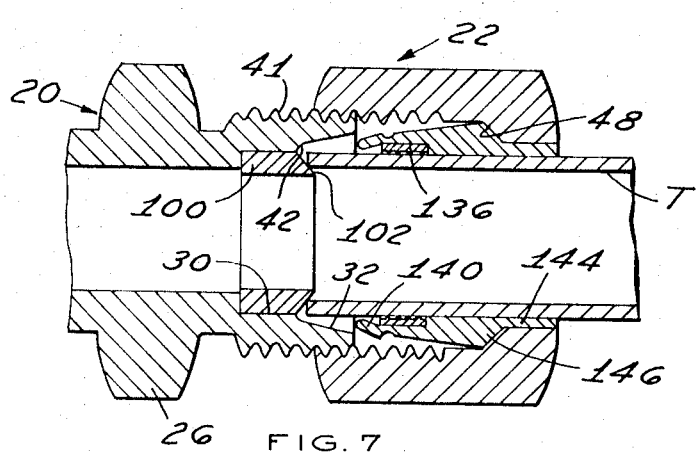
FIGURE 7 is a cross-sectional view of another embodiment of the tube coupling of this invention.
Figure 8:
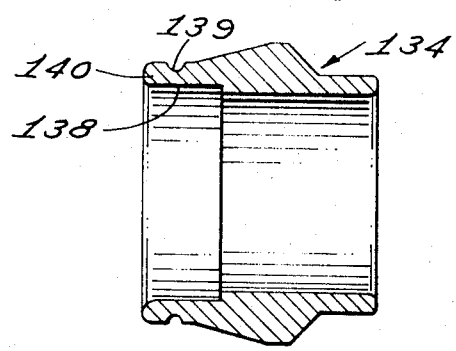
FIGURE 8 is a cross-sectional side view of the sleeve utilized in the coupling of FIGURE 7, prior to swaging of the leading end.

The embodiment of my invention shows in FIGURES 7 and 8 is similar to the embodiment disclosed in FIGURES 1 to 6, except that this embodiment is specifically adapted to flaring relatively thin wall tubing. The embodiment of FIGURES 7 and 8 also illustrate an alternative embodiment for the coupling sleeve.

In this embodiment, the coupling body counter bore 30 receives a flaring cone 100, which has a conical exterior surface 102 adapted to flare the leading end of the tube T. The coupling body 20, and the nut 22 may be identical to the body and nut shown in FIGURES 1 to 3, and has been numbered accordingly.

The sleeve 132 is provided with a counter bore 128, rather than an enclosed slot or groove, to permit utilization of a solid or unslotted biting ring 136. The exterior of the sleeve is provided with a circumferential radial groove 139, generally opposite the leading end of the biting ring 136. The groove facilitates sealing with relatively nonresilient sleeves, and therefore this embodiment may be preferred where the sleeve is formed from such materials as low carbon steel. The leading end of the biting ring 136 serves as a pivot point about which the sleeve end is deformed into sealing engagement with the tube. The deformation of the sleeve in this embodiment will be more permanent than the embodiment shown in FIGURES 1 to 6; especially where a relatively nonresilient material is used for the sleeve.

The function and operation of the coupling of this embodiment is similar to that described in relation to FIGURES 1 to 6, except that the tube end is flared by the conical insert 100 as it is urged into the coupling body. The coupling nut 122 urges the leading end 140 of the sleeve axially to abut the generally conical throat 32 of the coupling body. Further tightening of the nut 22 causes the leading end of the sleeve to deform radially into sealing engagement with the tube T adjacent the leading end of the biting ring 136. Further tightening of the coupling nut deforms the sleeve to substantially fill the space between the tube and the conical throat of the coupling body.

It will be understood by those skilled in the art that various modifications may be made to the embodiments disclosed. For example, the sleeve assembly shown in FIGURES 1 to 6 may be substituted for the sleeve assembly shown in FIGURES 7 to 8, or vice versa. Further the sleeve embodiment shown in FIGURE 6 may be provided with a counter bore, similar to 138 in FIGURE 7, rather than the enclosed slot 38 shown. The coupling of my invention has been shown with a conventional coupling body 20 and nut, except for the specific configuration of the throat of the coupling body, and it will be understood by those skilled in the art that various modifications may be made to these members without changing the invention as described herein.

What is claimed is:

1. A tube coupling, including a coupling body having a tube end receiving bore and an externally threaded exterior portion, said bore having a converting generally conical throat, a peripherally continuous metallic sleeve receivable over the end of a tube to be received in said coupling body bore, said metallic sleeve having a counterbore adjacent the forward leading end, said counterbore being defined by a forward end and a rearward radially extending wall, said sleeve fitting about said tube in close tolerance rearwardly from said rearward wall and being spaced from said tube forward of said forward end, said rearward wall defining a fulcrum area, a metallic biting ring received within the counterbore of said sleeve having a biting portion on the internal diameter deformable into the tube upon radial contraction of the ring, said ring having a radial thickness equal approximately to the radial dimension of said rearward wall, said sleeve having a deformable leading end extending axially beyond said biting ring of such an outside diameter as to initially abut said conical throat of the body portion, said leading end of the sleeve initially deformed about said fulcrum area within said throat radially into sealing engagement with the tube within the elastic limit of said sleeve, and said biting ring contracted into biting engagement with the tube prior to its entry into said throat, and said leading end of the sleeve adapted to be deformed about said fulcrum area into sealing engagement with the tube adjacent said biting ring, and a nut means threadably received on the threaded portion of said coupling body and cooperating with said sleeve for urging the sleeve into said conical throat of the coupling body.

2. The tube coupling defined in claim 1, characterized in that said metallic sleeve is softer than the coupling body, and said biting ring is harder than the tube received in said coupling body.

3. The tube coupling defined in claim 1, characterized in that said sleeve is formed from heat treated aluminum and is softer than the material of the coupling body, and said biting ring is steel and is harder than the tube to be received in the coupling body.

4. The tube coupling defined in claim 1, characterized in that said sleeve is elastically deformable into sealing contact with the tube.

5. The tube coupling defined in claim 4, characterized in that the sleeve is formed from heat treated aluminum.

6. The tube coupling defined in claim 1, characterized in that said converging conical throat of the coupling body bore terminates in an arcuate surface converging toward the tube adapted to increase the wedging action of the leading end of said sleeve as it is urged into said conical throat.

7. The tube coupling defined in claim 1, characterized in that said coupling body bore includes a flaring cone coaxially aligned with said bore to flare a tube end received in said bore.

References Cited

UNITED STATES PATENTS

| | | | |
|---|---|---|---|
| 2,037,812 | 4/1936 | McKendrick | 285—384 |
| 2,139,413 | 12/1938 | Kreidel | 285—386 X |
| 2,258,528 | 10/1941 | Wurzburger | 285—341 |
| 2,695,796 | 11/1954 | Woodling | 285—341 |
| 2,850,303 | 9/1958 | Bauer | 285—341 |
| 3,294,426 | 12/1966 | Lyon | 285—341 X |
| 3,325,192 | 6/1967 | Sullivan | 285—341 X |

CARL W. TOMLIN, Primary Examiner.

W. L. SHEDD, Assistant Examiner.

U.S. Cl. X.R.

285—385